United States Patent
Sehrawat et al.

(10) Patent No.: US 11,917,062 B2
(45) Date of Patent: Feb. 27, 2024

(54) KEY ROTATION VERIFICATION WITHOUT DECRYPTION

(71) Applicant: Seagate Technology LLC, Fremont, CA (US)

(72) Inventors: Vipin Singh Sehrawat, Fremont, CA (US); Josip Relota, Saratoga, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/824,750

(22) Filed: May 25, 2022

(65) Prior Publication Data

US 2023/0388116 A1 Nov. 30, 2023

(51) Int. Cl.
*H04L 9/00* (2022.01)
*H04L 9/08* (2006.01)
*H04L 9/16* (2006.01)

(52) U.S. Cl.
CPC ............... *H04L 9/16* (2013.01); *H04L 9/008* (2013.01); *H04L 9/0869* (2013.01)

(58) Field of Classification Search
CPC ......... H04L 9/16; H04L 9/008; H04L 9/0869; H04L 9/14; H04L 9/00; H04L 9/08
See application file for complete search history.

(56) References Cited

U.S. PATENT DOCUMENTS

| | | | |
|---|---|---|---|
| 7,697,690 B2 | 4/2010 | Fu et al. | |
| 8,504,844 B2 | 8/2013 | Browning | |
| 8,565,422 B2 | 10/2013 | Lee et al. | |
| 10,523,434 B1 | 12/2019 | Sharifi Mehr | |
| 10,587,406 B1 | 3/2020 | Levin et al. | |
| 11,057,359 B2 | 7/2021 | Wisniewski et al. | |
| 2019/0121955 A1* | 4/2019 | Facon | G06F 21/45 |
| 2020/0313856 A1* | 10/2020 | Basu | G06Q 20/02 |
| 2021/0184848 A1 | 6/2021 | Roowalla et al. | |
| 2021/0271763 A1* | 9/2021 | Perlman | G06F 21/602 |

(Continued)

OTHER PUBLICATIONS

Amazon. Protecting data using client-side encryption. 2006 <url: docs.aws.amazon.com/AmazonS3/latest/dev/UsingClientSideEncryption.html.>.

(Continued)

*Primary Examiner* — Quazi Farooqui
(74) *Attorney, Agent, or Firm* — HOLZER PATEL DRENNAN

(57) ABSTRACT

Key rotation verification without decryption is provided. Two ciphertext inputs encrypted from a plaintext input by an encryption function using different cryptographic keys are input, wherein the encryption function is selected from a function family having an output space of one or more convex sets. A divergence between the two ciphertext inputs is computed. A membership oracle is executed on the two ciphertext inputs, wherein the two ciphertext inputs are determined to be members of the same convex set of the one or more convex sets if the computed divergence satisfies a separation condition. The two ciphertext inputs are validated to both correspond to the same plaintext input, responsive to determining that the two ciphertext inputs are members of the same convex set, wherein the two ciphertext inputs do not correspond to the same plaintext input if the two ciphertext inputs are not members of the same convex set.

20 Claims, 4 Drawing Sheets

(56) References Cited

U.S. PATENT DOCUMENTS

2022/0094530 A1 3/2022 Sreeravindra

OTHER PUBLICATIONS

"Filecoin: A Decentralized Storage Network", Protocol Labs; <url: https://filecoin.io/filecoin.pdf>, 2017.
"Managing data encryption", Google; <url: cloud.google.com/storage/docs/encryption/>.
Agrawal, Shweta, et al., "Functional Encryption for Inner Product Predicates from Learning with Errors", In: Asiacrypt, 2011, 21-40.
Akavia, Adi, et al., "Simultaneous Hardcore Bits and Cryptography against Memory Attacks", TCC, 2009, 474-495.
Alkim, Erdem, et al., "The Lattice-Based Digital Signature Scheme qTESLA", <url: https://eprint.iacr.org/2019/085.pdf>, Apr. 2020.
Applebaum, Benny, et al., "Fast Cryptographic Primitives and Circular-Secure Encryption Based on Hard Learning Problems", Crypto, 2009, 595-618.
Baan, Hayo, et al., "Round5: Compact and Fast Post-quantum Public-Key Encryption", PQCrypto, 2019, 83-102.
Banerjee, Abhishek, et al., "Key-Homomorphic Constrained Pseudorandom Functions", TCC, 2015, 31-60.
Banerjee, Abhishek, et al., "New and Improved Key-Homomorphic Pseudorandom Functions", Crypto, 2014, 353-370.
Banerjee, Abhishek, et al., "Pseudorandom Functions and Lattices", Eurocrypt, 2012, 719-737.
Bernstein, Daniel J., et al., "NTRU Prime: Reducing Attack Surface at Low Cost", SAC, 2017, 235-260.
Boneh, Dan, et al., "Key homomorphic PRFs and their applications", Crypto, 2013, 410-428.
Bos, Joppe, "Crystals-Kyber: A CCA-Secure Module—Lattice-Based KEM", IEEE European Symposium on Security and Privacy (EuroS&P), 2018, 353-367.
Bos, Joppe W., et al., "Frodo: Take off the ring! practical, quantum-secure key exchange from LWE", ACM SIGSAC Conference on Computer and Communications Security, 2016, 1006-1018.
Bos, Joppe W., et al., "Improved Security for a Ring-Based Fully Homomorphic Encryption Scheme", IMA International Conference on Cryptography and Coding, 2013, 45-64.
Bos, Joppe W., et al., "Post-Quantum Key Exchange for the TLS Protocol from the Ring Learning with Errors Problem", IEEE Symposium on Security and Privacy (S&P), 2015, 553-570.
Brakerski, Zvika, et al., "(Leveled) Fully Homomorphic Encryption without Bootstrapping", ACM Transactions on Computation Theory 6.3, 2014.
Brakerski, Zvika, et al., "A Cryptographic Test of Quantumness and Certifiable Randomness from a Single Quantum DeviceJournal of the ACM", Journal of the ACM 68.5, 2021, 1-47.
Brakerski, Zvika, et al., "Classical hardness of learning with errors", STOC, 2013, 575-584.
Brakerski, Zvika, et al., "Constrained Key-Homomorphic PRFs from Standard Lattice Assumptions—or: How to Secretly Embed a Circuit in Your PRF", TCC, 2015, 1-30.
Brakerski, Zvika, et al., "Fully Homomorphic Encryption from Ring-LWE and Security for Key Dependent Messages", Crypto, 2011, 505-524.
Brakerski, Zvika, "Two-message statistically sender-private OT from LWE", TCC, 2018, 370-390.
Brandao, Fernando G.S.L., et al., "Quantum SDP solvers: Large speed-ups, optimality, and applications to quantum learning", 46th International Colloquium on Automata, Languages, and Programming ICALP, 2019, 27:1-27:14.
Brandao, Fernando G.S.L., et al., "Quantum speed-ups for solving semidefinite programs", FOCS, 2017, 415-426.
Bubeck, SéBastien, "Convex Optimization: Algorithms and Complexity", Foundations and Trends® in Machine Learning 8, 2015, 231-357.

D'Anvers, Jan-Pieter, et al., "Saber: Module-LWR Based Key Exchange, CPA-Secure Encryption and CCA-Secure KEM", Africacrypt, 2018, 282-305.
Ducas, LéO, et al., "Crystals-Dilithium: A Lattice-Based Digital Signature Scheme", IACR <url: https://eprint.iacr.org/2017/633.pdf>, 2017.
Duong, Dung Hoang, "Efficient Secure Matrix Multiplication Over LWE-Based Homomorphic Encryption", Tatra Mountains Mathematical Publications 67.1, 2016, 69-83.
Everspaugh, A., et al., "Key rotation for authenticated encryption", Crypto, 2017, 98-129.
Fan, Junfeng, et al., "Somewhat Practical Fully Homomorphic Encryption", Cryptology ePrint Archive, Report 2012/144. https://eprint.iacr.org/2012/144, 2012.
Fouque, Pierre-Alain, et al., "Falcon: Fast-Fourier Lattice-based Compact Signatures over NTRU", url: https://falcon-sign.info/falcon.pdf.
Gentry, Craig, et al., "Graph-Induced Multilinear Maps from Lattices", Theory of Cryptography, 2014, 498-527.
Gentry, Craig, "Trapdoors for hard lattices and new cryptographic constructions", STOC, 2008, 197-206.
Goldwasser, Shafi, et al., "Reusable garbled circuits and succinct functional encryption", STOC, 2013, 555-564.
Grotschel, Martin, et al., "Geometric Algorithms and Combinatorial Optimization", Algorithms and Combinatorics. Springer, Berlin, Heidelberg, 1993.
Halevi, Shai, et al., "Implementing BP-Obfuscation Using Graph-Induced Encoding", CCS, 2017, 783-798.
Jordan, Stephen P., et al., "Quantum Computation Beyond the Circuit Model", PHD Thesis, MIT, 2008.
Mahadev, Urmila, "Classical Verification of Quantum Computations", FOCS, 2018, 259-267.
Katz, Jonathan, et al., "Smooth Projective Hashing and Password-Based Authenticated Key Exchange from Lattices", Asiacrypt, 2009, 636-652.
Khachiyan, L.G., "Polynomial algorithms in linear programming", USSR Computational Mathematics and Mathematical Physics; 20.1, 1980, 53-72.
Lehmann, Anja, et al., "Updatable Encryption with Post-Compromise Security", Eurocrypt, 2018, 685-716.
Lin, Huijia, "Indistinguishability obfuscation from constant-degree graded encoding schemes", Eurocrypt, 2010.
López-Alt, Adriana, et al., "On-the-fly multiparty computation on the cloud via multikey fully homomorphic encryption", STOC, 2012, 1219-1234.
Lu, Xianhui, et al., "LAC: Practical Ring-LWE Based Public-Key Encryption with Byte-Level Modulus", Cryptology ePrint Archive, Report 2018/1009. <https://eprint.iacr.org/2018/1009>, 2018.
Lyubashevsky, Vadim, "Fiat-Shamir with Aborts: Applications to Lattice and Factoring-Based Signatures", Asiacrypt, 2009, 598-616.
Lyubashevsky, Vadim, "Lattice Signatures without Trapdoors", Eurocrypt, 2012, 738-755.
Lyubashevsky, Vadim, et al., "On Ideal Lattices and Learning with Errors over Rings", Eurocrypt, 2010.
Mahadev, Urmila, "Classical Homomorphic Encryption for Quantum Circuits", FOCS, 2018, 332-338.
Micciancio, Daniele, et al., "Hardness of SIS and LWE with Small Parameters", Crypto, 2013, 21-39.
Peikert, Chris, "A Decade of Lattice Cryptography", Foundations and Trends in Theoretical Computer 10, 2016, 283-424.
Peikert, Chris, et al., "A Framework for Efficient and Composable Oblivious Transfer", Crypto, 2008, 554-571.
Peikert, Chris, et al., "Efficient Collision-Resistant Hashing from Worst-Case Assumptions on Cyclic Lattices", TCC, 2006, 145-166.
Peikert, Chris, et al., "Noninteractive Zero Knowledge for NP from (Plain) Learning with Errors", Crypto, 2019, 89-114.
Peikert, Chris, "Public-key cryptosystems from the worst-case shortest vector problem", STOC, 2009, 333-342.
Quach, Willy, "UC-Secure OT from LWE, Revisited", SCN, 2020, 192-211.
Regev, Oded, "On lattices, learning with errors, random linear codes, and cryptography", STOC, 2005, 84-93.

(56) References Cited

OTHER PUBLICATIONS

Rückert, Markus, "Lattice-Based Blind Signatures", Asiacrypt, 2010, 413-430.

Sehrawat, Vipin Singh, et al., "Bi-Homomorphic Lattice-Based PRFs and Unidirectional Updatable Encryption", CANS. vol. 11829. LNCS, Springer, 2019, 3-23.

Sehrawat, Vipin Singh, et al., "Extremal set theory and LWE based access structure hiding verifiable secret sharing with malicious-majority and free verification", Theoretical Computer Science 886, 2021, 106-138.

Sehrawat, Vipin Singh, "Privacy Enhancing Cryptographic Constructs for Cloud and Distributed Security", PhD thesis. The University of Texas at Dallas, 2019.

Shor, P. W., "Algorithms for quantum computation: discrete logarithms and factoring", FOCS, 1994, 124-134.

Shor, Naum Z., "Utilization of the Operation of Space Dilatation in the Minimization of Convex Functions", Cybernetics, 1972.

Van Apeldoorn, et al., "Convex optimization using quantum oracles", Quantum 4, 2020, 220.

Van Apeldoorn, et al., "Improvements in quantum SDPsolving with applications", ICALP; 15, 2019, 1-99.

Van Apeldoorn, Joran, et al., "Quantum SDPsolvers: Better upper and lower bounds", FOCS, 2017, 403-414.

Wang, Lihua, et al., "A New Secure Matrix Multiplication from Ring-LWE", CANS, 2017, 93-111.

\* cited by examiner

200

```
┌─────────────────────────────────────────────────────────────────────┐
│ Input two ciphertext inputs encrypted from one or more plaintext inputs by an │
│         encryption function using different encryption keys          │
│                                 202                                  │
└─────────────────────────────────────────────────────────────────────┘
                                    │
                                    ▼
┌─────────────────────────────────────────────────────────────────────┐
│         Compute a divergence between the two ciphertext inputs       │
│                                 204                                  │
└─────────────────────────────────────────────────────────────────────┘
                                    │
                                    ▼
┌─────────────────────────────────────────────────────────────────────┐
│ Execute a membership oracle on the two ciphertext inputs, wherein the two │
│  ciphertext inputs are determined to be members of the convex set if the  │
│           computed divergence satisfies a separation condition            │
│                                 206                                  │
└─────────────────────────────────────────────────────────────────────┘
                                    │
                                    ▼
┌─────────────────────────────────────────────────────────────────────┐
│  Validate that the two ciphertext inputs represent the same plaintext input, │
│ responsive to determining that the two ciphertext inputs are members of the │
│                             same convex set                          │
│                                 208                                  │
└─────────────────────────────────────────────────────────────────────┘
```

FIG. 2

KEY ROTATION VERIFICATION WITHOUT DECRYPTION

SUMMARY

The described technology provides key rotation verification without decryption. Two ciphertext inputs encrypted from a plaintext input by an encryption function using different cryptographic keys are input, wherein the encryption function is selected from a function family having an output space of one or more convex sets. A divergence between the two ciphertext inputs is computed. A membership oracle is executed on the two ciphertext inputs, wherein the two ciphertext inputs are determined to be members of the same convex set of the one or more convex sets if the computed divergence satisfies a separation condition. It is validated that the two ciphertext inputs both correspond to the same plaintext input, responsive to determining that the two ciphertext inputs are members of the same convex set of the one or more convex sets, wherein the two ciphertext inputs do not correspond to the same plaintext input if the two ciphertext inputs are not members of the same convex set of the one or more convex sets.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 2 illustrates example operations for verifying key rotation without decryption.

DETAILED DESCRIPTIONS

In data storage, data records are typically secured by cryptographic methods, such as encrypting the data records using one or more cryptographic keys. However, such keys are subject to attack by adversaries, who have an increasing chance of discovering the keys over time. As such, key rotation may be used to revoke old keys and replace them with new keys, thereby substantially resetting the adversary's efforts to obtain access to the encrypted data records. Alternatively, key rotation may be employed to enforce data access revocation or expiration. Generally, key rotation refers to the process of (periodically) exchanging the cryptographic keys that are used to secure the data. For example, the old key is used to decrypt the data records, and then the new key is used to encrypt the data records. In this manner, compromised keys or unauthorized data access can be revoked in favor of secure keys and data access.

In practical applications, an administrator or user may wish to verify that the key rotation was successful. One such verification method would involve decrypting the data record using the new key and then comparing the decrypted plaintext to a known version of the plaintext. Unfortunately, this procedure introduced several security risks and undesirable overhead. For example, the verifier would need access to the known version of the plaintext, which circumvents the security imposed by the encryption in the first place. Furthermore, decrypting the encrypted data record using the new key once again risks exposing the plaintext to unwanted parties. Moreover, verifying key rotation using decryption is a computationally-intensive process, particularly on large databases. As such, more secure and less resource-intensive methods of verifying key rotation would be beneficial.

Figure 1:
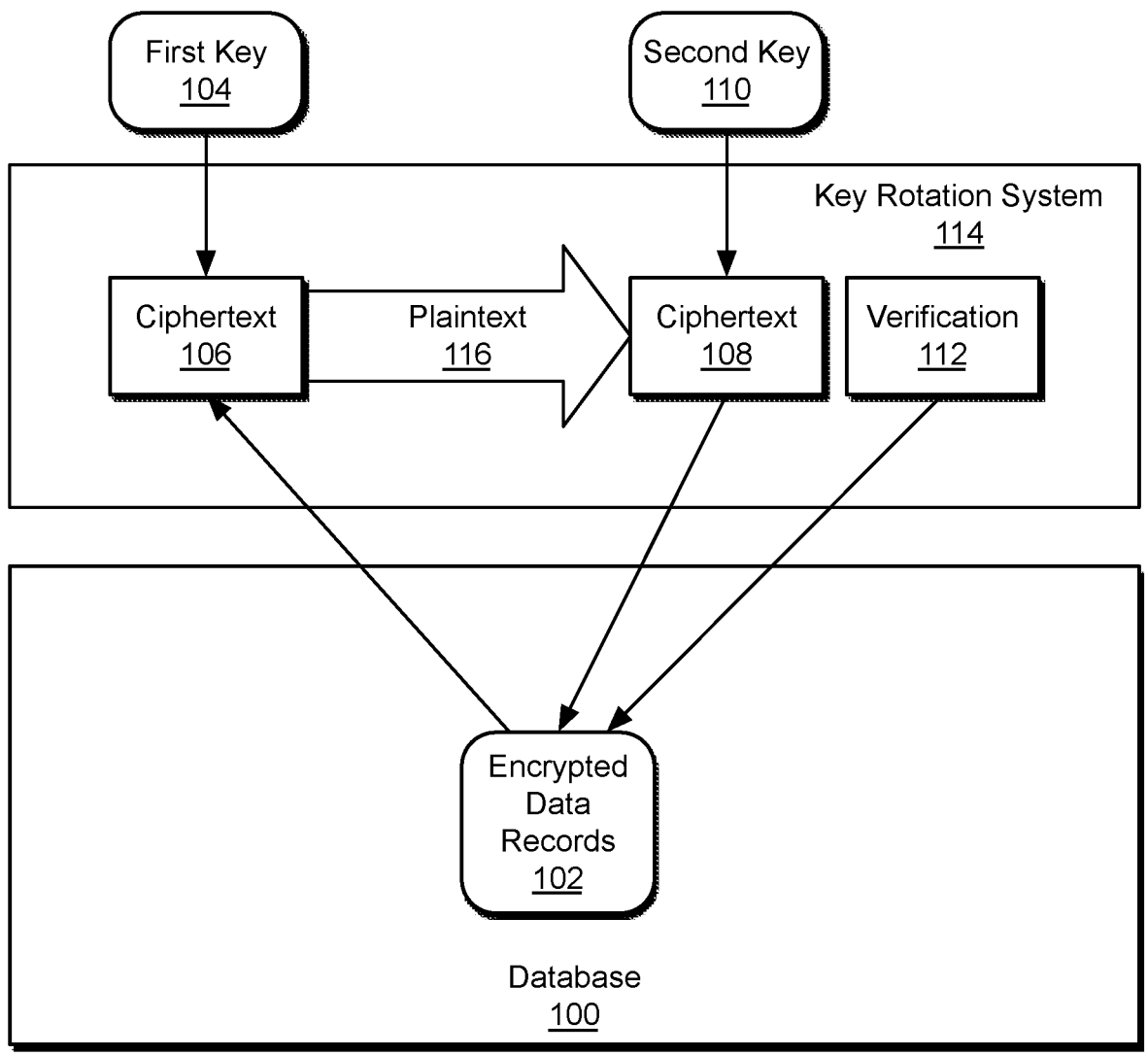
FIG. 1 illustrates example key rotation verification without decryption.

FIG. 1 illustrates example key rotation verification without decryption. A database 100 contains ciphertext of one or more encrypted data records 102 in secure storage. At one point in time, plaintext 116 of the encrypted data records 102 have been encrypted into one or more first ciphertext inputs using one or more cryptographic keys, designated as first key 104. In one implementation, key rotation is performed via techniques, such as updatable encryption and proxy re-encryption, that allow updating/rotating the encryption keys without decryption and without access to any key—in an initial state, the plaintext 116 is encrypted as ciphertext 106 by the first key 104; in a second state, the same plaintext 116 is encrypted as ciphertext 108 by a second key 110, if the key rotation was successful.

In one implementation, key rotation is performed by changing the encryption of the plaintext input based on a first cryptographic key from a first ciphertext input to a second ciphertext input as an encryption of the plaintext input based on a second (different) cryptographic key. As such, the ciphertext inputs correspond to the same plaintext 116 if the key rotation was successful, and the described technology validates this without decrypting the ciphertext inputs themselves or requiring a comparison to a known version of the plaintext.

At some subsequent point in time, an administrator or user (collectively referred to as a "user") wishes to verify that the key rotation was successful and that the new keys 110 were indeed used to encrypt the encrypted data records 102 and may be used to decrypt the encrypted data records 102. However, since the encrypted data is likely stored on third-party server(s), the user also wishes to avoid the security risks and resource utilization associated with actually decrypting the encrypted data records 102 using the new keys and then comparing the decrypted data records with a known version of the plaintext (which the user may or may not even possess). Moreover, doing so would be grossly inefficient. Accordingly, the verification operation 112 validates the successful key rotation without decrypting the encrypted data records 102.

The described technology will be disclosed herein with both formal notation and proofs, as well as a narrative technical description. As an introductory matter, the concept of "learning with errors" or LWE is described. The learning with errors (LWE) problem has emerged as a popular hard problem for constructing lattice-based/post-quantum cryptographic solutions. Many cryptosystems rely on the hardness assumption of the LWE problem, including without limitation identity-based, leakage-resilient, fully homomorphic, functional, public-key/key-encapsulation encryptions, oblivious transfer, (blind) signatures, PRFs (pseudorandom functions), secret sharing, hash functions, secure matrix multiplication computation, verifiable quantumness, non-interactive zero-knowledge proof system for an NP language (e.g., NP is a class of languages where, given x and a proof y, one can deterministically check, in time polynomial in the size of x and y, as to whether y really does prove that x is in the NP language. In addition, the size of y is bounded by some polynomial in the size of x), certifiable randomness generation, obfuscation, and quantum homomorphic encryption.

Definition 1 (Decision-LWE) For positive integers n and q≥2, and an error (probability) distribution $\chi=\chi(n)$ over $\mathbb{Z}_q$, the decision-LWE$_{n,q,\chi}$ problem is to distinguish between the following pairs of distributions:

$(A, As + e)$ and $(A, u)$, where $A \xleftarrow{\$} \mathbb{Z}_q^{w \times n}, w = (n), s \in \mathbb{Z}_q^n, e \xleftarrow{\$} \chi^w$ and $u \xleftarrow{\$} \mathbb{Z}_q^w$.

Definition 2 (Search-LWE~[05]) For positive integers n and q≥2, and an error (probability) distribution $\chi=\chi(n)$ over $\mathbb{Z}_q$, the search-LWE$_{n,q,\chi}$ problem is to recover $s \in \mathbb{Z}_q^n$, given $(A, As + e)$ where $A \xleftarrow{\$} \mathbb{Z}_q^{w \times n}, s \in \mathbb{Z}_q^n, e \xleftarrow{\$} \chi^w$ and $w = (n)$.

For certain noise distributions and a sufficiently large q, the LWE problem is as hard as the worst-case SIVP (shortest independent vectors problem) and GapSVP (Gap shortest vector problem) under a quantum reduction. The fixed vector s can be sampled from a low norm distribution (in particular, from the noise distribution $\chi$), and the resulting problem is as hard as the original LWE problem. The noise distribution $\chi$ can also be a simple low-norm distribution.

Optimization is a fundamental problem in mathematics and computer science, with many real-world applications. One of the most successful continuous optimization paradigms is convex optimization, which optimizes a convex function over a convex set that is given explicitly (by a set of constraints) or implicitly (by an oracle). A convex optimization problem is an optimization problem in which the objective function is a convex function, and the feasible set is a convex set. A function $f$ mapping some subset of $\mathbb{R}^n$ into $\mathbb{R} \cup \{\pm\infty\}$ is convex if its domain is convex and for all $\theta \in [0,1]$ and all x, y in its domain, the following condition holds:

$f(\theta x+(1-\theta)y) \leq \theta f(x)+(1-\theta)f(y)$.

A set S is convex if for all members x, y∈S and all $\theta \in [0,1]$, we have that $\theta x+(1-\theta)y \in S$. Concretely, a convex optimization problem is the problem of finding some x*∈C attaining: $\inf\{f(x): x \in C\}$, where the objective function $f: \mathbb{R} \subseteq \mathbb{R}^n \to \mathbb{R}$ is convex, as is the feasible set C. If such a point exists, it is referred to as an optimal point or solution and the set of all optimal points is called the optimal set. If $f$ is unbounded below over C or the infimum is not attained, then the optimization problem is said to be unbounded. Otherwise, if C is the empty set, then the problem is said to be infeasible.

An example environment in which the described technology may be applied is provided below, describing a blockchain environment implementing a cryptocurrency and digital payment system intended to be a blockchain-based cooperative digital storage and data retrieval platform. In this platform, the concept of "space-time" is used to allow the metering of the data stored in the network with an expiry time. The platform aims to provide the functionality of recycling and re-allocating the free storage on participating nodes. The platform can be seen as a blockchain with a marketplace based on the platform's cryptocurrency for selling and buying extra storage capacity. Primarily, there are five actors in this ecosystem:

1. Storage Miners: the nodes that provide storage to a platform using their free disk space. These storage miner nodes are on the supply side of the storage market. The transactions occurring on the storage market contribute new blocks to the platform's blockchain. Storage miners rely on the following three components:
   A unique storage miner actor address is assigned to each storage miner.
   Owner keypair is provided by the miner ahead of registration, and its public key is associated with the miner address. The owner keypair can be used to administer a miner and withdraw funds.
   Worker keypair is the public key associated with the storage miner actor address. It can be chosen and changed by the miner. It is used to sign blocks and (optionally) other messages.

2. Retrieval Miners: the nodes that provide network resources, such as bandwidth, helping retrieval clients search for the retrieval information. These nodes are on the supply side of the retrieval market.

3. Token Holders: nodes configured to make the platform's cryptocurrency valuable by using it as a medium of exchange and as collateral.

4. Chain Verifier Node: a node providing the minimum functionality that a node needs to have in order to participate in the platform's network. This type of node does not play an active role in the network unless it implements client node functionality, as described in the following item. A chain verifier node synchronizes the chain when it first joins the network to reach current consensus. From then on, the node is constantly fetching any addition to the chain (i.e., receiving the latest blocks) and validating them to reach a consensus state.

5. Client Node: a node that builds on top of the chain verifier node and is implemented by any application that is building on the platform's network. The client node can be thought of as the main infrastructure node of applications, such as exchanges or decentralized storage applications built on the platform. The node should implement the storage market and retrieval market client services. In one implementation, there are the following two types of client nodes:
   Storage Clients: those who need file storage services. They are on the demand side of the storage market.
   Retrieval Clients: those who desire to retrieve a specific resource from the network. They are the demand side of the retrieval market.

In an application of the described technology, a user wants the retrieval miners to perform a secure key rotation/update on his or her ciphertext. However, the user would like to verify the integrity of the underlying plaintext (e.g., ensure that the retrieval miner performed a key rotation operation correctly). However, the user wants to verify the correctness of the key rotation/update without first decrypting the ciphertext and comparing the plaintext against a known version of the plaintext. Clearly, there are following two serious drawbacks to such decryption and comparison:

1. The user must possess a copy of the plaintext to perform the verification. However, the user storing the plaintext defeats the whole purpose of outsourcing its storage.

2. Since secure encryption schemes are probabilistic, verification requires full decryption of the ciphertext. The complexity of this operation grows with the size of the plaintext.

In contrast, the described technology addresses the problem of verifying the integrity and correctness of ciphertext generated via key update(s), such that the verification procedure addresses one or more of the following requirements:

- Its runtime complexity is independent of the size of the plaintext and ciphertext.
- Verifying the $k^{th}$ (updated) ciphertext does not leak non-negligible information about the plaintext (w.r.t. the $k-1^{th}$ update).
- The runtime complexity is ideally constant or at most $\log(S)$, where S is the size of the plaintext.

In this context, the described technology provides key rotation verification without decrypting the cybertext to be verified. Suppose $\mathcal{F}: \mathcal{K} \times \mathcal{P} \to X$ be a function with a convex range $X \subset \mathbb{R} \cup \{\pm\sqrt{}\}$. Each member function $f(k, p) \in \mathcal{F}$ is indexed by the parameters $k \in \mathbb{Z}_q^n$ and $p \in \mathbb{Z}_p^m$. The challenge in designing such a function family for the example use case is that the function family is to be non-invertible without possessing at least one of the parameters—along with the function output. Multiple quantum-safe function classes exist that can satisfy the requirements necessary for $\mathcal{F}$. As a proof, such a function family is constructed by altering a lattice-based key-homomorphic pseudorandom function (PRF) family. The full construction is presented in the following text.

Let $l = \lceil \log q \rceil$. Define a gadget vector as:

$$g = (1, 2, 4, \ldots, 2^{l-1}) \in \mathbb{Z}_q^l.$$

Define a deterministic decomposition function $g^{-1}$: $\mathbb{Z}_q \to \{0, 1\}^d$, such that $g^{-1}(\alpha)$ is a "short" vector and $\forall \alpha \in \mathbb{Z}_q$, it holds that: $(g, g^{-1}(\alpha)) = \alpha$, where $(\cdot)$ denotes the inner product. The function $g^{-1}$ is defined as:

$$g^{-1}(\alpha) = (x_0, x_1, \ldots, x_{l-1}) \in \{0, 1\}^l$$

where $$a = \sum_{i=0}^{l-1} x_i 2^i$$

is the binary representation of $\alpha$. The gadget vector is used to define the gadget matrix G as:

$$G = I_n \otimes g = \text{diag}(g, \ldots, g) \in \mathbb{Z}_q^{n \times nl},$$

where $I_n$ is the n×n identity matrix and $\otimes$ denotes the Kronecker product. The binary decomposition function, $g^{-1}$, is applied entry-wise to vectors and matrices over $\mathbb{Z}_q$. Thus, $g^{-1}$ is extended to get another deterministic decomposition function $G^{-1}: \mathbb{Z}_q^{n \times m} \to \{0, 1\}^{nl \times m}$, such that, $G \cdot G^{-1}(A) = A$.

Let T be a full binary tree with at least one node, with T.r and T.l denoting its right and left subtree, respectively. For two randomly sampled matrices, $A_0, A_1 \in \mathbb{Z}_q^{n \times nl}$ define function $A_T(x): \{0, 1\}^{|T|} \to \mathbb{Z}_q^{n \times nl}$ as:

$$A_T(x) = \begin{cases} A_x & \text{if } |T| = 1 \\ A_{T.l}(x_l) \cdot G^{-1}(A_{T.r}(x_r)) & \text{otherwise,} \end{cases}$$

where $x = x_l \| x_r$, for $x_l \in \{0, 1\}^{|T.l|}$, $x_r \in \{0, 1\}^{|T.r|}$. The KH-PRF function family is defined as:

$$\mathcal{F}_{A_0, A_1, T} = \{F_s: \{0, 1\}^{|T|} \to X\}.$$

A member of the function family F is indexed by the seed $s \in \{-1, 0, 1\}^n$ as:

$$F_s(x) = s \cdot A_T(x) + e \bmod q, \text{ where } e \xleftarrow{\$} \{-1, 0, 1\}^n.$$

It is also worth mentioning that using such errors to generate hard LWE instances is a debatable topic as doing so causes a large Rényi divergence from the errors used by other deterministic—and even probabilistic—hard-to-invert functions that are based on LWE. However, since there is no concrete evidence proving that such errors lead to significantly weaker LWE instances, these errors were chosen along with adding an additional constraint which is:

$$wt(|e|) \leq \frac{n}{ql},$$

where wt(x) denotes the Hamming weight of x. On the other hand, sampling the seeds as $s \in \{-1, 0, 1\}^n$ is a proven method to generate hard-to-invert LWE instances. Note that the function family $\mathcal{F}$ has two parameters, namely the key/seed s and the plaintext/input x.

It can be proven that the output space of $\mathcal{F}$ is a convex set. The proof follows directly from the output space being $\mathbb{Z}_q^n$. $\mathcal{F}$ is a quantum-safe family of key-homomorphic PRFs, and $\mathcal{F}$ can be used to realize secure, symmetric, bi-directional updatable encryption. Based on the described technology, no two plaintexts can exist in the same smaller convex set within $\mathbb{Z}_q^n$. The central idea is to limit the permitted plaintexts such that $$wt(x_1 \circ x_2) < \frac{n}{ql}$$

for any two plaintexts $x_1, x_2$.

To verify that a given ciphertext $C$ corresponds to plaintext P, the verifier has access to a separation oracle $\mathcal{O}$ for the convex set to which encryptions of P belong within $\mathbb{Z}_q^n$. However, in order to implement a separation oracle, a membership oracle is used in one implementation as follows: translate $C$ to the nearest element of a sufficiently "coarse" public subset of p<<q, well-separated values in $\mathbb{Z}_q^n$ (e.g., a subgroup), where p is a prime. Let $C'$ be a previous encryption of P, i.e., before the latest key update which generated $C$. Compute the Rényi divergence between $C$ and $C'$ and if that computed divergence is $$\leq \frac{n}{ql}$$

(an example separation condition), then output "yes" (validating that the two ciphertexts correspond to the same plaintext), else output "no" (indicating that the two ciphertexts do not correspond to the same plaintext). Using this membership oracle, one or more quantum algorithms can implement a separation oracle with query complexity $\tilde{O}(1)$. Accordingly, the membership oracle can determine whether $C$ and $C'$ correspond to the same plaintext P without decrypting any of them.

With regard to the separation condition, the manner in which the function family is selected allows the system to leverage this separation condition, which essentially states that for carefully selected (e.g., two or more) plaintexts, the probability that any function from the function family maps them to the same convex set is negligible. Hence, the separation condition separates the domain via the separates exhibited in the range of the function family.

FIG. 2 illustrates example operations 200 for verifying key rotation without decryption. An inputting operation 202 inputs two ciphertext inputs encrypted from one or more plaintext inputs by an encryption function using different encryption keys. For example, a first ciphertext input was encrypted using an old cryptographic key, and a second ciphertext input was encrypted using a new cryptographic key, after a key rotation action. The encryption function is selected from a function family having an output space of one or more convex sets.

A divergence operation 204 computes a divergence between the two ciphertext inputs. In one implementation, the divergence is a Rényi divergence, although other types of divergence computations may be employed. A membership operation 206 executes a membership oracle on the two ciphertext inputs. The two ciphertext inputs are determined to be members of the convex set if the computed divergence satisfies a separation condition. A validation operation 208 validates that the two ciphertext inputs correspond to the same plaintext input, responsive to determining that the two ciphertext inputs are members of the same convex set of the one or more convex sets, wherein the two ciphertext inputs do not correspond to the same plaintext input if the two ciphertext inputs are members of different convex sets of the one or more convex sets. In this manner, the validation of successful key rotation does not require decryption of either ciphertext input and/or the possession of the original plaintext.

Figure 3:
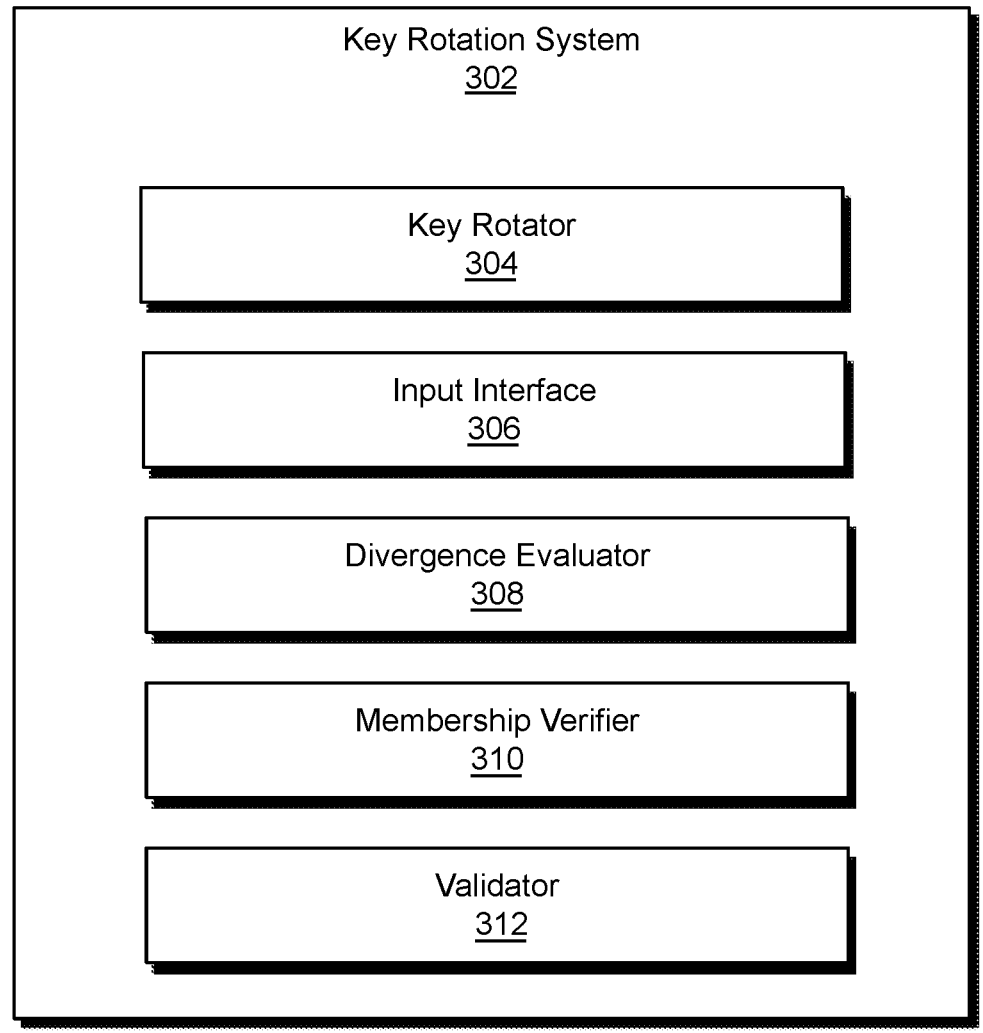
FIG. 3 illustrates an example system verifying key rotation without decryption.

FIG. 3 illustrates an example system 300 for verifying key rotation without decryption. Each of the components of the system 300 may be implemented in software (executable on one or more hardware processors), circuitry, or a combination of software and circuitry. The system 300 includes a key rotation system 302 that includes components configured to rotate the cryptographic keys securing ciphertext inputs in encrypted data records and to verify correct key rotation without decrypting the ciphertext inputs. In alternative implementations, the key rotation operations may be performed by a separate system to system 300, which is then limited to verifying the correct key rotation without decrypting the ciphertext inputs.

In at least one implementation, a key rotator 304 is configured to select the encryption function from the function family having the output space of one or more convex sets. Also, in some implementations, the key rotator 304 is configured to select the encryption function from the function family having the output space of the one or more convex sets.

An input interface 306 is configured to input two ciphertext inputs encrypted from one or more plaintext inputs by an encryption function using different encryption keys. For example, a first ciphertext input was encrypted using an old cryptographic key, and a second ciphertext input was encrypted using a new cryptographic key, after a key rotation action. The encryption function is selected from a function family having an output space of one or more convex sets. In some implementations, the input interface 306 receives the two ciphertexts from a key rotator 304 of the system 300. In other implementations, the input interface 306 receives the two ciphertexts from external systems or from storage.

A divergence evaluator 308 is configured to compute a divergence between the two ciphertext inputs. In one implementation, the divergence is a Rényi divergence, although other types of divergence computations may be employed. A membership verifier 310 is configured to execute a membership oracle on the two ciphertext inputs. The two ciphertext inputs are determined to be members of the same convex set of the one or more convex sets if the computed divergence satisfies a separation condition. A validator 312 is configured to validate that the two ciphertext inputs correspond to the same plaintext input, responsive to determining that the two ciphertext inputs are members of the same convex set of the one or more convex sets, wherein the two ciphertext inputs do not correspond to the same plaintext input if the two ciphertext inputs are not members of the same convex set of the one or more convex sets. In this manner, the validation of successful key rotation does not require decryption of either ciphertext input and/or the possession of the original plaintext.

Figure 4:
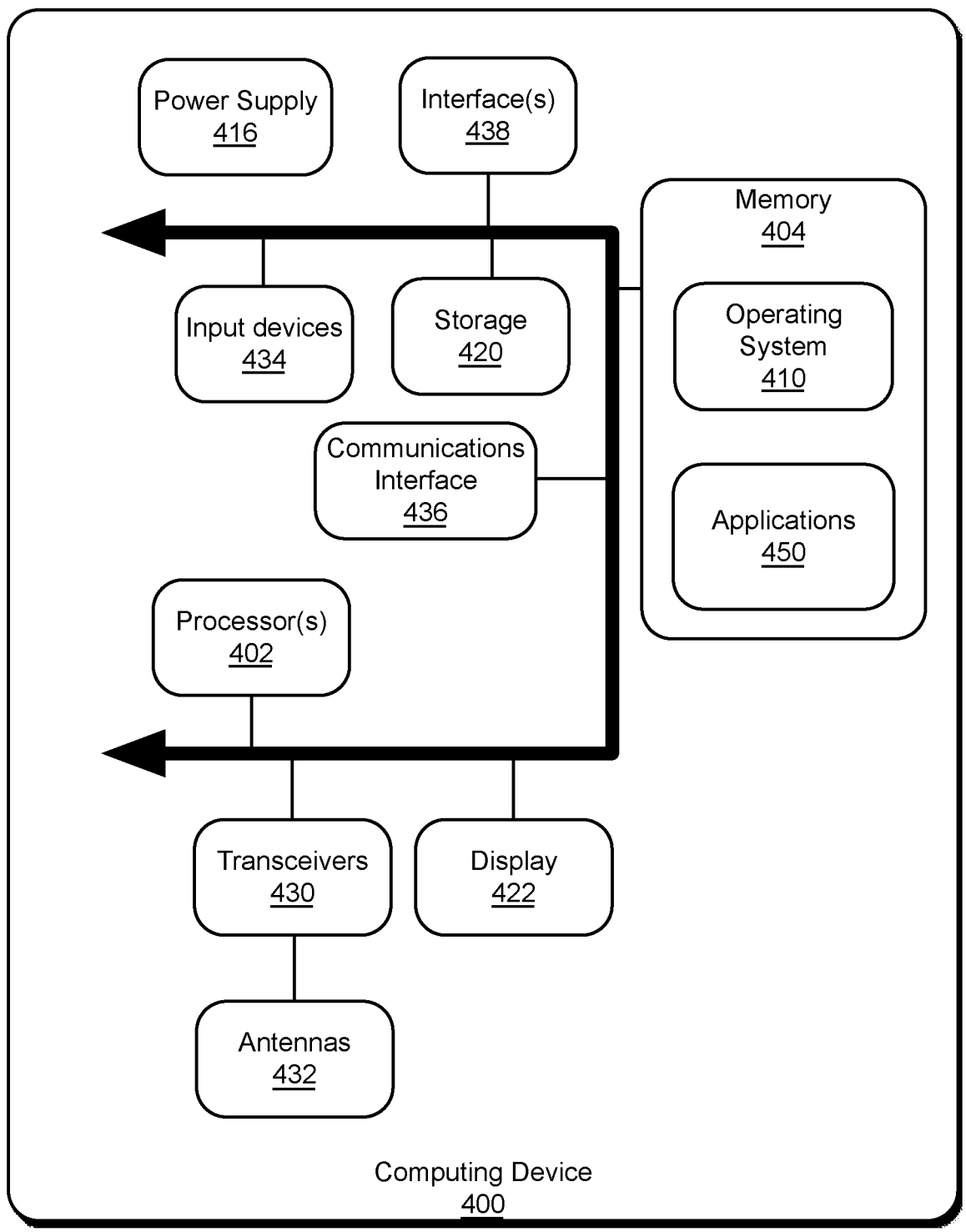
FIG. 4 illustrates an example computing device for implementing the features and operations of the described technology.

FIG. 4 illustrates an example computing device 400 for implementing the features and operations of the described technology. The computing device 400 may embody a remote control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 400 includes one or more hardware processor(s) 402 and a memory 404. The memory 404 generally includes both volatile memory (e.g., RAM) and nonvolatile memory (e.g., flash memory). An operating system 410 resides in the memory 404 and is executed by the hardware processor(s) 402.

In an example computing device 400, as shown in FIG. 4, one or more modules or segments, such as applications 450, a key rotator, an input interface, a divergence evaluator, a membership verifier, a validator, and other services, workloads, and modules, are loaded into the operating system 410 on the memory 404 and/or storage 420 and executed by hardware processor(s) 402 or other circuitry. Such modules or segments may include software executable by processors or other circuitry, circuitry alone, or a combination thereof. The storage 420 may include one or more tangible storage media devices and may store cryptographic keys, ciphertexts, plaintext, data records, and other data and may be local to the computing device 400 or may be remote and communicatively connected to the computing device 400.

The computing device 400 includes a power supply 416, which is powered by one or more batteries or other power sources and which provides power to other components of the computing device 400. The power supply 416 may also be connected to an external power source that overrides or recharges the built-in batteries or other power sources.

The computing device 400 may include one or more communication transceivers 430 that may be connected to one or more antenna(s) 432 to provide network connectivity (e.g., mobile phone network, Wi-Fi®, Bluetooth®) to one or more other servers and/or client devices (e.g., mobile devices, desktop computers, or laptop computers). The computing device 400 may further include a network adapter 436, which is a type of computing device. The computing device 400 may use the adapter and any other types of computing devices for establishing connections over a wide-area network (WAN) or local-area network (LAN). It should be appreciated that the network connections shown are exemplary and that other computing devices and means for establishing a communications link between the computing device 400 and other devices may be used.

The computing device 400 may include one or more input devices 434 such that a user may enter commands and information (e.g., a keyboard or mouse). These and other input devices may be coupled to the server by one or more interfaces 438, such as a serial port interface, parallel port, or universal serial bus (USB). The computing device 400 may further include a display 422, such as a touch screen display.

The computing device 400 may include a variety of tangible processor-readable storage media and intangible processor-readable communication signals. Tangible processor-readable storage can be embodied by any available media that can be accessed by the computing device 400 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 400. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more hardware processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote control device and/or a physical controlled device 802 implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across multiple user sessions. A service may be available to one or more system components, programs, and/or other services. In some implementations, a service may run on one or more server computing devices.

While this specification contains many specific implementation details, these should not be construed as limitations on the scope of any inventions or of what may be claimed, but rather as descriptions of features specific to particular embodiments of particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A computing-processor-implemented method of verifying key rotation, the computing-processor-implemented method comprising:
    inputting two ciphertext inputs encrypted from one or more plaintext inputs by an encryption function using different cryptographic keys, wherein the encryption function is selected from a function family having an output space of one or more convex sets, wherein for any two points in each of the convex sets, the corresponding convex set contains a whole line segment joining the two points, wherein each point represents an output of a key-homomorphic pseudorandom function;

computing a divergence between the two ciphertext inputs;

executing a membership oracle on the two ciphertext inputs, wherein the membership oracle determines whether the two ciphertext inputs are in the same convex set and the two ciphertext inputs are determined to be members of a same convex set of the one or more convex sets if the computed divergence satisfies a separation condition; and validating that the two ciphertext inputs both correspond to a same plaintext input, responsive to determining that the two ciphertext inputs are members of the same convex set of the one or more convex sets, wherein the two ciphertext inputs do not correspond to the same plaintext input if the two ciphertext inputs are not members of the same convex set of the one or more convex sets.

2. The computing-processor-implemented method of claim 1, wherein the divergence computed between the two ciphertext inputs is a Rényi divergence.

3. The computing-processor-implemented method of claim 1, wherein the executing operation comprises:
executing the separation oracle using one or more membership oracles in which the computed divergence is evaluated against the separation condition.

4. The computing-processor-implemented method of claim 1, further comprising:
selecting the encryption function from the function family having the output space of the one more convex sets.

5. The computing-processor-implemented method of claim 1, further comprising:
executing a cryptographic key rotation by changing a first encryption of the plaintext input based on a first cryptographic key of the different cryptographic keys from a first ciphertext input of the ciphertext inputs to a second ciphertext input of the ciphertext inputs as a second encryption of the plaintext input based on a different cryptographic key of the different cryptographic keys, wherein the two ciphertext inputs are input to the inputting operation.

6. The computing-processor-implemented method of claim 1, wherein the function family is a quantum-safe family of key-homomorphic pseudorandom functions within the one or more convex sets.

7. The computing-processor-implemented method of claim 1, wherein the validating operation does not decrypt either of the two ciphertext inputs to verify that the two ciphertext inputs correspond to the same plaintext input.

8. A system for verifying key rotation, the system comprising:
one or more hardware processors;
an input interface executable by the one or more hardware processors and configured to input two ciphertext inputs encrypted from one or more plaintext inputs by an encryption function using different cryptographic keys, wherein the encryption function is selected from a function family having an output space of one or more convex sets, wherein for any two points in each of the convex sets, the corresponding convex set contains a whole line segment joining the two points wherein each point represents an output of a key-homomorphic pseudorandom function;
a divergence evaluator executable by the one or more hardware processors and configured to compute a divergence between the two ciphertext inputs;
a membership verifier executable by the one or more hardware processors and configured to execute a membership oracle on the two ciphertext inputs, wherein the membership oracle determines whether the two ciphertext inputs are in the same convex set and the two ciphertext inputs are determined to be members of a same convex set of the one or more convex sets if the computed divergence satisfies a separation condition; and
a validator executable by the one or more hardware processors and configured to validate that the two ciphertext inputs both correspond to a same plaintext input, responsive to determining that the two ciphertext inputs are members of the same convex set of the one or more convex sets, wherein the two ciphertext inputs do not correspond to the same plaintext input if the two ciphertext inputs are not members of the same convex set of the one or more convex sets.

9. The system of claim 8, wherein the divergence computed between the two ciphertext inputs is a Rényi divergence.

10. The system of claim 8, wherein the divergence evaluator is configured to execute the separation oracle using one or more membership oracles in which the computed divergence is evaluated against the separation condition.

11. The system of claim 8, further comprising:
a key rotator executable by the one or more hardware processors and configured to select the encryption function from the function family having the output space of the one or more convex sets.

12. The system of claim 8, further comprising:
a key rotator executable by the one or more hardware processors and configured to execute a cryptographic key rotation by changing a first encryption of the plaintext input based on a first cryptographic key of the different cryptographic keys from a first ciphertext input of the ciphertext inputs to a second ciphertext input of the ciphertext inputs as a second encryption of the plaintext input based on a different cryptographic key of the different cryptographic keys, wherein the two ciphertext inputs are input to the inputting operation.

13. The system of claim 8, wherein the function family is a quantum-safe family of key-homomorphic pseudorandom functions within the one or more convex sets.

14. The system of claim 8, wherein validation of key rotation does not decrypt either of the two ciphertext inputs to verify that the two ciphertext inputs correspond to the same plaintext input.

15. One or more tangible processor-readable storage media embodied with instructions for executing on one or more processors and circuits of a computing device a process for verifying key rotation, the process comprising:
inputting two ciphertext inputs encrypted from one or more plaintext inputs by an encryption function using different cryptographic keys, wherein the encryption function is selected from a function family having an output space of one or more convex sets, wherein for any two points in each of the convex sets, the corresponding convex set contains a whole line segment joining the two points, wherein each point represents an output of a key-homomorphic pseudorandom function;
computing a divergence between the two ciphertext inputs;
executing a membership oracle on the two ciphertext inputs, wherein the membership oracle determines whether the two ciphertext inputs are in the same convex set and the two ciphertext inputs are determined to be members of a same convex set of the one or more convex sets if the computed divergence satisfies a separation condition; and validating that the two ciphertext inputs both correspond to a same plaintext input, responsive to determining that the two ciphertext inputs are members of the same convex set of the one or more convex sets, wherein the two ciphertext inputs do not correspond to the same plaintext input if the two ciphertext inputs are not members of the same convex set of the one or more convex sets.

16. The one or more tangible processor-readable storage media of claim 15, wherein the executing operation comprises:

executing the separation oracle using one or more membership oracles in which the computed divergence is evaluated against the separation condition.

17. The one or more tangible processor-readable storage media of claim 15, further comprising:

selecting the encryption function from the function family having the output space of the one or more convex sets.

18. The one or more tangible processor-readable storage media of claim 15, further comprising:

executing a cryptographic key rotation by changing a first encryption of the plaintext input based on a first cryptographic key of the different cryptographic keys from a first ciphertext input of the ciphertext inputs to a second ciphertext input of the ciphertext inputs as a second encryption of the plaintext input based on a different cryptographic key of the different cryptographic keys, wherein the two ciphertext inputs are input to the inputting operation.

19. The one or more tangible processor-readable storage media of claim 15, wherein the function family is a quantum-safe family of key-homomorphic pseudorandom functions within the one or more convex sets.

20. The one or more tangible processor-readable storage media of claim 15, wherein the validating operation does not decrypt either of the two ciphertext inputs to verify that the two ciphertext inputs correspond to the same plaintext input.

* * * * *